W. G. WILSON.
VALVE OF INTERNAL COMBUSTION ENGINES OF THE SLEEVE VALVE TYPE.
APPLICATION FILED AUG. 12, 1920.

1,368,203.

Patented Feb. 8, 1921.

UNITED STATES PATENT OFFICE.

WALTER GORDON WILSON, OF CHARTON, FARNINGHAM, ENGLAND.

VALVE OF INTERNAL-COMBUSTION ENGINES OF THE SLEEVE-VALVE TYPE.

1,368,203.

Specification of Letters Patent.

Patented Feb. 8, 1921.

Application filed August 12, 1920. Serial No. 403,110.

*To all whom it may concern:*

Be it known that I, WALTER GORDON WILSON, a subject of the King of Great Britain, and resident of Charton, Farningham, in the county of Kent, England, have invented certain new and useful Improvements in or Relating to the Valves of Internal-Combustion Engines of the Sleeve-Valve Type, of which the following is a specification.

This invention relates to improvements in connection with the valves of internal combustion engines of the sleeve valve type, and particularly to that kind wherein the valve rod is adapted to reciprocate in a guide hole either bored longitudinally in the cylinder wall or similarly furnished by the bore of a tube adjacent and parallel to the cylinder, and wherein a pin projecting from the said valve rod passes through a longitudinal slot in the cylinder wall to the inside of the cylinder where it engages with the valve.

The object of the invention is to provide an improved device of the above kind, in which there are no screws, loose pins or the like which can become loosened or fall out, in which the stresses induced in the valve rod are not likely to become excessive, and wherein the parts may be more easily assembled than heretofore.

The invention consists broadly of a sleeve valve operating device of the kind comprising one or more longitudinal guide holes, valve rods adapted to reciprocate therein and a pin projecting from each of the said valve rods and passing through a longitudinal slot in the cylinder wall to engage with the valve, wherein the said pin and the said valve rod are adapted either to be made integral or to be first connected in their operative relationship and afterward assembled as one unit into their operative position in the engine.

In accordance with my invention the longitudinal guide hole for each valve rod is constituted by the space remaining when a key or filling piece is thrust into a longitudinal hole of such dimension that the valve rod and pin projecting therefrom can be together entered within the said longitudinal hole when the key or filling piece is absent.

My invention thus has the advantage that the pin can be made integral or substantially so with the valve rod, the parts being assembled by first entering the valve and pin into the longitudinal hole and passing the pin through the longitudinal slot in the cylinder wall, and next inserting the key or filling piece.

Figure 1:
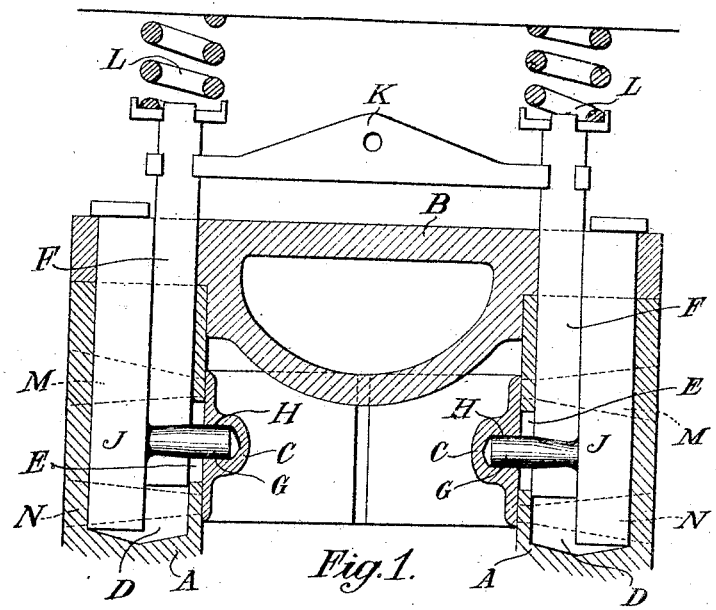

An embodiment of my invention is illustrated in the accompanying drawings wherein, Figure 1 is an elevational view in section of the upper part of a cylinder having a sleeve valve pin and valve rod fitted in accordance with my invention.

Figure 2:
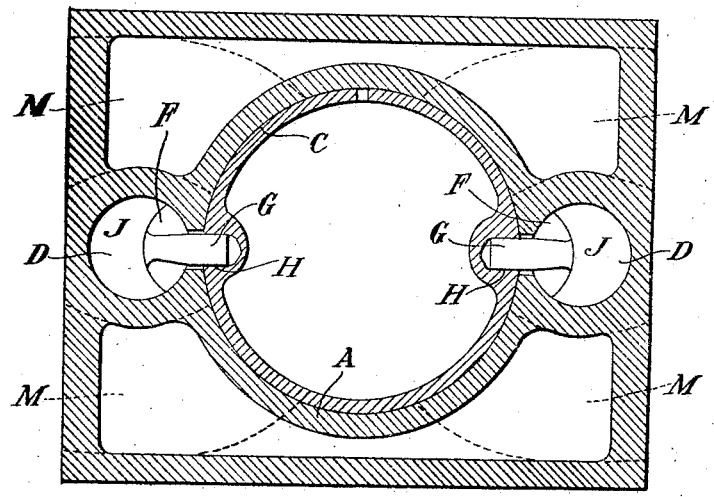

Fig. 2 is a plan view in section of the same.

In both these drawings A is the cylinder wall, B is the cylinder cover and C is the sleeve valve. Integral with the cylinder wall A are formed two longitudinal circular holes D preferably in diametrically opposite positions as shown, and these holes are made to communicate with the inside of the cylinder by means of longitudinal slots E. F are the two valve rods of the sleeve valve C, and G are pins projecting from the said valve rods through the longitudinal slots E and operatingly connecting the said valve rods F with the valve C by filling into two recesses H in the external periphery of the said valve C. J are two keys or filling pieces adapted to be assembled after the aforementioned members are in position and constituting, together with the circular holes D, longitudinal guide holes for the reciprocating valve rods F.

These valve rods F are connected with the valve operating mechanism (not shown) by means of the cross piece K, and in the preferred design this mechanism positively operates the valve rods on the up stroke only the down stroke being performed under the influence of two coil or other springs L in order that damage should not be occasioned if the parts were badly adjusted and a collision occurred between the valve C and the engine piston (not shown). The inlet ports M and the exhaust ports N of the cylinder are shown dotted.

The valve rods F together with the projecting pins G, and also the keys or filling pieces J are preferably cut out of steel bars of diameter equal to that of the longitudinal holes D, and it is of importance to note that the valve rod and key together form a complete cylinder so that within the limits of the lateral clearance between the pins G and the longitudinal slots E, the valve rods and the keys can rotate as one unit in the holes D. This is important as it allows the valve C to be engaged by the pin G without any stresses due to slightly inaccurate workmanship.

What I claim and desire to secure by Letters Patent is:—

1. An internal combustion engine comprising a cylinder, a sleeve valve in said cylinder, valve rods for operating said sleeve valve, said rods engaging said valve through the medium of pins which pass through slots in the cylinder wall, holes in said cylinder of such a diameter as will permit both the insertion of said rods and ultimate connection with the sleeve valve, and filling pieces adapted to reside in the said holes with and form a complement of the valve rods which are slidable in such holes.

2. An internal combustion engine comprising a cylinder, a sleeve valve in said cylinder, valve rods for operating said sleeve valve, pins permanently secured to said rods and adapted to project through slots in the cylinder wall and engage opposite sides of said sleeve valve, holes in said cylinder of such a diameter as will permit the insertion of the said rods together with their pins, and filling pieces adapted to reside in the said holes with, and form a complement of, the valve rods, said rods being slidable in such holes.

3. An internal combustion engine comprising a cylinder, a sleeve valve in said cylinder, valve rods for operating said sleeve valve, pins permanently secured to said rods and adapted to project through slots in the cylinder wall and engage opposite sides of said sleeve valve, holes in said cylinder of such a diameter as will permit the insertion of the said rods together with their pins, and filling pieces adapted to reside in the said holes and form a complete cylinder with the valve rods whereby said rods and filling pieces may rotate as one unit in the holes for the purposes of adjustment said rods being capable of sliding therein relatively to the filling pieces.

In witness whereof I affix my signature.

WALTER GORDON WILSON.